(12) United States Patent
Qiu et al.

(10) Patent No.: US 12,501,421 B2
(45) Date of Patent: Dec. 16, 2025

(54) METHOD TO SCHEDULE DATA TRANSMISSION

(71) Applicant: ZTE Corporation, Shenzhen (CN)

(72) Inventors: Zhihong Qiu, Shenzhen (CN); He Huang, Shenzhen (CN); Nan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 525 days.

(21) Appl. No.: 17/482,609

(22) Filed: Sep. 23, 2021

(65) Prior Publication Data

US 2022/0015120 A1    Jan. 13, 2022

Related U.S. Application Data

(63) Continuation of application No. PCT/CN2019/080237, filed on Mar. 28, 2019.

(51) Int. Cl.
*H04W 72/1268* (2023.01)
*H04W 72/0446* (2023.01)
*H04W 72/23* (2023.01)
*H04W 84/06* (2009.01)

(52) U.S. Cl.
CPC ... *H04W 72/1268* (2013.01); *H04W 72/0446* (2013.01); *H04W 72/23* (2023.01); *H04W 84/06* (2013.01)

(58) Field of Classification Search
CPC .............. H04B 7/185; H04W 56/005; H04W 72/0446; H04W 72/1268; H04W 72/23; H04W 84/06
See application file for complete search history.

(56) References Cited

U.S. PATENT DOCUMENTS

| | | | |
|---|---|---|---|
| 2005/0190712 A1* | 9/2005 | Lee ..................... | H04W 72/23 370/312 |
| 2008/0219190 A1* | 9/2008 | Haartsen .............. | H04B 7/2681 370/280 |
| 2013/0308610 A1* | 11/2013 | Bergstrom ............ | H04W 56/00 370/336 |
| 2016/0270038 A1* | 9/2016 | Papasakellariou .... | H04L 1/1896 |
| 2018/0049225 A1* | 2/2018 | Lee ................... | H04W 72/1263 |
| 2018/0077719 A1* | 3/2018 | Nory .................... | H04W 72/21 |
| 2018/0167936 A1* | 6/2018 | Quan ................. | H04W 72/0446 |

(Continued)

FOREIGN PATENT DOCUMENTS

| | | |
|---|---|---|
| CN | 102387495 A | 3/2012 |
| CN | 106686750 A | 5/2017 |

(Continued)

OTHER PUBLICATIONS

B4 Extended European Search Report regarding EP 19 92 0727 dated Feb. 21, 2022, 8 pages.

(Continued)

*Primary Examiner* — Kashif Siddiqui
(74) *Attorney, Agent, or Firm* — Crowell & Moring LLP (57) ABSTRACT

Method, systems and devices for data transmission in a cell having large transmission delay. In particular embodiments, assisting information may be sent from a network device to a communication device. The assisting information may be used to calculate a timing offset to determine a correct transmission time to compensate for propagation delay in large cell with significant propagation delay.

10 Claims, 9 Drawing Sheets

(56) References Cited

U.S. PATENT DOCUMENTS

| | | | |
|---|---|---|---|
| 2019/0074891 A1 | 3/2019 | Kwon et al. | |
| 2019/0174523 A1* | 6/2019 | Wang | H04W 56/0015 |
| 2019/0320458 A1* | 10/2019 | Hosseini | H04W 72/00 |
| 2020/0037350 A1* | 1/2020 | Park | H04L 5/0094 |
| 2020/0068646 A1* | 2/2020 | Kwon | H04W 68/005 |
| 2020/0187242 A1* | 6/2020 | Höglund | H04W 74/0833 |
| 2020/0313946 A1* | 10/2020 | Sun | H04L 27/26025 |
| 2021/0105761 A1* | 4/2021 | Cheng | H04W 74/0833 |

FOREIGN PATENT DOCUMENTS

| | | | |
|---|---|---|---|
| CN | 108012329 A | 5/2018 | |
| CN | 108024259 A | 5/2018 | |
| WO | WO 2017/172479 A1 | 10/2017 | |

OTHER PUBLICATIONS

International Search Report and Written Opinion regarding PCT/CN2019/080237 dated Dec. 30, 2019.

\* cited by examiner

METHOD TO SCHEDULE DATA TRANSMISSION

CROSS-REFERENCE TO RELATED APPLICATION

This application is a continuation application of PCT International Patent Application No. PCT/CN2019/080237, filed with the China National Intellectual Property Administration, PRC on Mar. 28, 2019, which is herein incorporated by reference in its entirety.

TECHNICAL FIELD

This document is directed generally to wireless communications.

BACKGROUND

Wireless communication technologies are moving the world toward an increasingly connected and networked society. Next generation telecommunication systems are providing even wider and more comprehensive coverage and capabilities. Next generation telecommunications systems even will provide communication services through non-terrestrial networks (NTN). These include satellite systems, including low-earth orbit (LEO) satellites, medium-earth orbit (MEO) satellites, geosynchronous earth orbit (GEO) satellites, highly elliptical earth orbit (HEO) satellites and unmanned aircraft systems (UAS). Such systems provide telecommunication services to user equipment and other communication devices that are on or near the ground or are airborne. Expansion of telecommunication service to NTN systems creates new technical problems that require solutions.

SUMMARY

This document relates to methods, systems, and devices for improved telecommunications. For next generation telecommunication systems, larger cell sizes might be used. Cell coverage in the future telecommunications systems can be excessively large. One example is in NTN systems which have typical cell coverage ranges from 100 km to 1000 km in diameter. Larger cell size will lead to significant transmission delay. The distance from a communication device to a network device may be tens of kilometers to hundreds of kilometers. The transmission delay at such a distance, along with the variability of transmission delays across a cell, will be significant and must be accommodated. Thus an enhancement of data transmission procedures may also be required.

The above and other aspects and their implementations are described in greater detail in the drawings, the descriptions, and the claims.

BRIEF DESCRIPTION OF THE DRAWINGS

FIGS. 6-8 are example timing flow diagrams illustrating communication in the communication network of FIG. 1.

DETAILED DESCRIPTION

The presently disclosed embodiments relate generally to telecommunication systems. More particularly, the presently disclosed embodiments relate to uplink data transmission in cells with large transmission delay. In some embodiments, a network device communicates assisting information over a radio channel to a communication device and the communication device uses the assisting information to calculate a time interval and/or timing advance for an uplink transmission. The communication device then transmits the uplink at the calculated time. In another embodiment, the network equipment receives a preamble transmitted by a communication device but is unable to distinguish the exact time-frequency resource the received preamble transmitted on. The preamble can be included in a random access request message. The random access request message can be Msg1 for 4-step RACH or MsgA for 2 step RACH. A solution based on RA resource configuration or based on assisting information is provided. In another embodiments, enhancement on hybrid automatic repeat request (HARQ) by disabling e.g. feedback of HARQ and/or open loop HARQ is presented to accommodate the impact introducing by large transmission delay.

Figure 1:
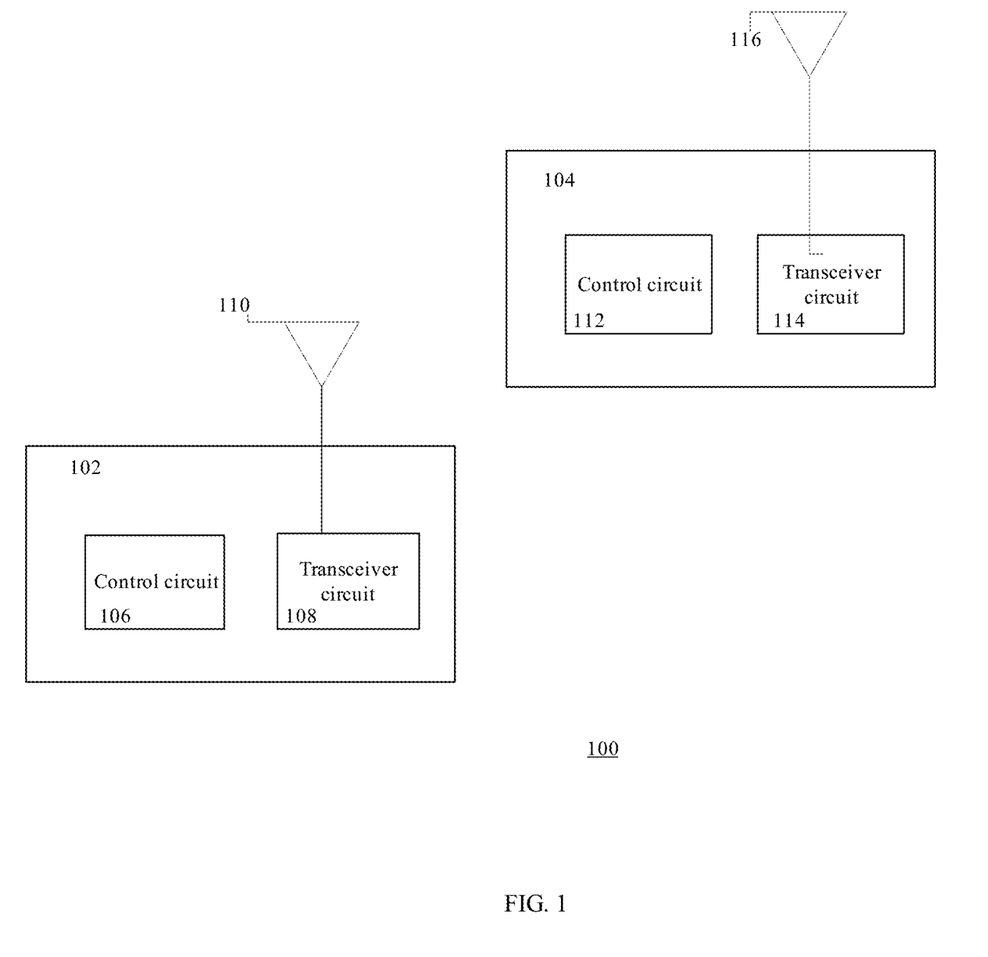
FIG. 1 shows an example of a communications system.

Referring now to the drawing, FIG. 1 is an example block diagram of a communication system 100. In the example, the communication system 100 includes a communication device 102 and a network device 104. In other embodiments, the communication system 100 may include other types and number of devices, including other network devices and other communication devices.

The communication device 102 includes a control circuit 106, a transceiver circuit 108 and an antenna 110. The control circuit 106 includes electronics for controlling operation of the communication device 104, such as one or more processors and memory for storing data and instructions for the processors. The transceiver circuit 108 includes a transmitter and receiver for radio communication using the antenna 110, for example on the communication system 100 with the network device 104. The transceiver circuit 108 includes electronics such as processors and memory for processing data, timing electronics for managing timing aspects of radio communication, etc.

The network device 104 includes a control circuit 112, a transceiver circuit 114 and an antenna 116. The control circuit 112 includes electronics for controlling operation of the communication device 104, including one or more processors and memory for storing data and instructions for the processors. The transceiver circuit 114 includes a transmitter and receiver for radio communication using the antenna 116, for example on the communication system 100 with the communication device 102. The transceiver circuit 114 includes electronics such as processors and memory for processing data, timing electronics for managing timing aspects of radio communication, etc. The network device may further include network communication equipment (not shown) for communication with one or more other network devices and for other communication networks such as cellular and landline telecommunication networks.

In some embodiments, the communication system 100 including the communication device 102 and the network device 104 form part of a 5G or 3GPP communication network and operate according to air interface standards for such network. In one embodiment, the communication system including the network device 104 is part of a non-terrestrial network (NTN) in which case the network device may be one or more satellites or UAS platforms. Such a satellite or UAS platform provides telecommunication services to communication devices such as the communication device 102 in a cell or service area, such as on the ground. The satellite or UAS platform is in further radio communication with one or more terrestrial gateways or one or more satellites to provide telecommunication services for the communication device 102. The satellite or UAS platform is referred to herein for convenience as a next generation node B or gNB. Similarly, the communication device may be referred to herein a user equipment or UE.

While the features and advantages of the illustrated embodiments are described in conjunction with a 5G NTN, the claims are not so limited. The features and embodiments shown and claimed herein may be extended to any suitable communication network or system, whether terrestrial or non-terrestrial.

The communication device 102 may initiate communication with the network device through a random access (RA) procedure using a predefined random access control channel (RACH) and/or a physical uplink shared channel (PUSCH). A transmitting device (such as the communication device 102 or the network device 104) and a receiving device (such as the network device 104 and the communication device 102) use commonly defined radio channels for reliable communication.

Figure 2:
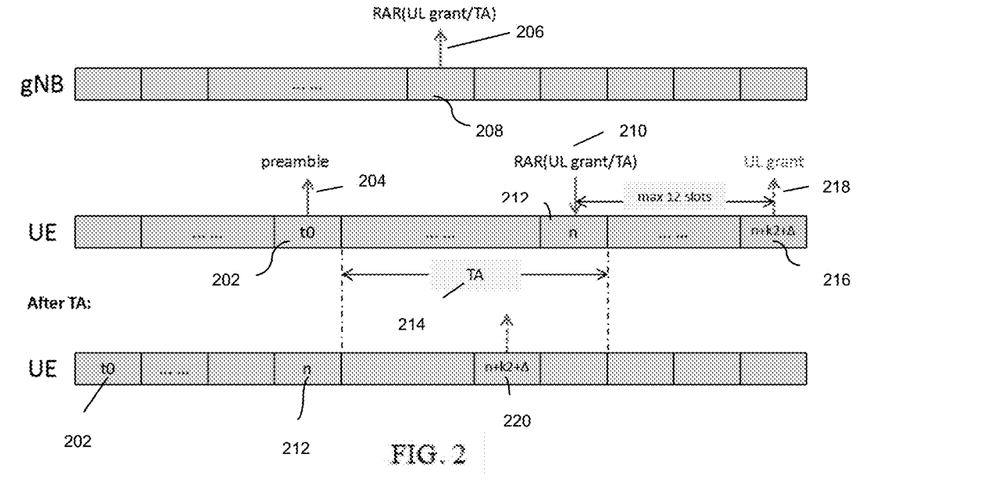
FIG. 2 is an example of a timing diagram for data interchange on the communication system of FIG. 1.

FIG. 2 is an example of a timing diagram for data interchange on the communication system of FIG. 1. FIG. 2 shows communication between a network device labelled gNB and a communication device labelled UE in a communications network. Communication begins at a time slot 202 when the UE transmits a preamble 204 on the RACH. The UE also uses a physical uplink shared channel (PUSCH) and a physical downlink shared channel (PDSCH) for communication with the gNB. At a later time, the preamble is received at the gNB which responds at time slot 208 with a RA response (RAR) message including an uplink grant and a timing advance (TA) value. The TA value is intended to compensate the propagation delay in the network. The gNB determines the TA value for each respective UE in the network and provides the TA value to the UE for subsequent use.

In networks such as non-terrestrial networks, the propagation delay from the UE to the gNB can be significant and can create a technical problem. For example, in some embodiments, for a PUSCH transmission scheduled by a RAR UL grant 210, if a UE receives a PDSCH with a RAR message ending in slot n 212 for a corresponding physical random access channel (PRACH) transmission from the UE, the UE transmits the subsequent PUSCH in slot $n+k_2+\Delta$ 216 where $k_2$ and $\Delta$ are time intervals predefined by a standard. Slot n 212 is the slot where the UE receives the RAR message from the gNB and is expected to respond with the transmission labelled Msg3 in FIG. 2 at slot $n+k_2+\Delta$ 216. In some embodiments the maximum duration between the RAR message 210 and Msg3 218 is 6 ms. However, this is much smaller than the TA value, which is at most hundreds of microseconds. As shown in FIG. 2, the time slot 220 specified by the UL grant in the RAR message 206 is even earlier before reception of the RAR message at slot 212.

In other embodiments, a downlink control information (DCI) is used to communicate scheduling information to the UE by the gNB. In accordance with the standard, PUSCH will be transmitted at $n+k_2$, where n is the slot in which the UE receives PDCCH for uplink transmission. According to current standard, the maximum time duration for PUSCH scheduling is 4 ms, meaning that when DCI is used for scheduling the uplink transmission a similar error case as in RAR message case will be expected.

Figure 3:
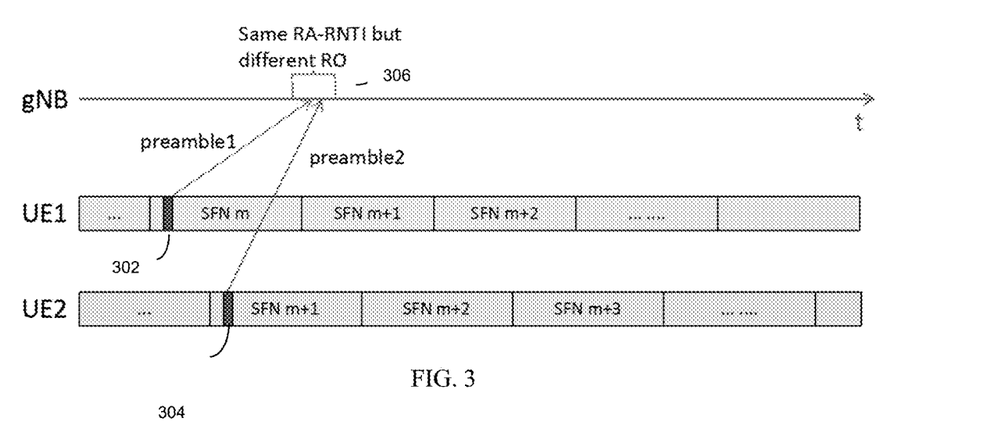
FIG. 3 is an example of a timing diagram for data interchange on the communication system of FIG. 1.

FIG. 3 is another example of a timing diagram for data interchange on the communication system of FIG. 1. FIG. 3 shows communication between a network device labelled gNB and two communication devices labelled UE1 and UE2 in a communications network. FIG. 3 illustrates another technical problem that can arise due to significant propagation delay in the communication network, such as in an NTN network including satellites or UAS platform distant from the UE device.

FIG. 3 illustrates the case where the two UE devices, UE1 and UE2, initiate a random access procedure using different time-frequency resources at separated system frames. Each transmission includes a preamble scrambled with Random Access Radio Network Temporary Identity (RA-RNTI), which is calculated according to the time-frequency resource used for transmitting the preamble. Communication device UE1 transmits preamble1 at slot 302. Communication device UE2 transmits preamble2 at slot 304. If a difference in transmission propagation delays is significant, their preambles could fall into the same processing window 306 at the gNB, and the gNB cannot differentiate which time-frequency resource each received preamble is transmitted on.

Figure 4:
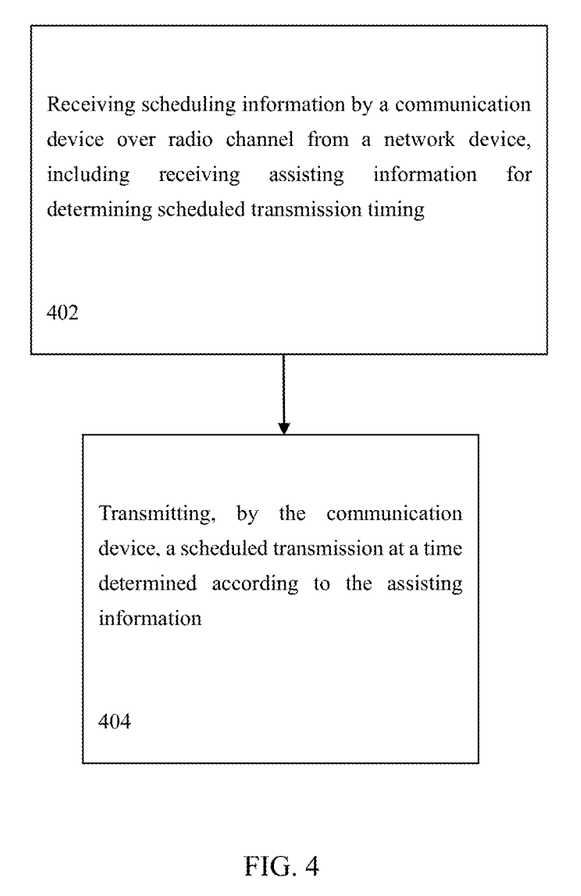
FIGS. 4-6 are example methods for communication in the communication network of FIG. 1.

FIG. 4 is an example method for communication in a communication network such communication network 100 of FIG. 1. FIG. 4 shows one embodiment of a method for uplink transmission in a cell with large transmission delay, viewed from the perspective of a communication device such as the communication device 102 in FIG. 1. The method begins at block 402, where a communication device receives scheduling information over a radio channel from a network device. The scheduling information includes receiving assisting information for determining scheduled transmission timing. At block 404, the method further includes transmitting, by the communication device, a scheduled transmission at a time determined according to the assisting information. The scheduled transmission may be intended for receipt by a network device such as the network device that transmitted the scheduling information. Using the assisting information, the communication device adjusts timing of its scheduled transmission to accommodate the significant transmission delay in the network, for example due to large cell size. In this manner, the network device cooperates with the communication device to compensate for the propagation delay.

In the example of FIG. 4, the UE utilizes the received assisting information included in scheduling information from network device to calculate the time interval for scheduled uplink transmission. The scheduling information may be downlink control information (DCI) or configured grant or uplink grant provided in RA response of random access procedure. The RA response message can be an RA response for a 4-step RACH procedure (herein refer to as Msg2), or an RA response for a two-step RACH (herein refer to as MsgB). The UE then transmits uplink data on the calculated timing.

Any suitable assisting information may be provided to the UE or other communication device by the gNB or other network device. The assisting information is used to help calculating the transmitting time for uplink transmission.

Various alternatives may be used, depending on implementation. Some alternative embodiments for assisting information are described here.

In a first embodiment, a table of offsets is defined and used for determining a timing offset for the uplink transmission by the communication device. For each offset value given in the table, a corresponding index will be defined for searching in the table. For example, if index 0 is provided to the UE, the UE interprets that index value to mean offset value1 will be used to help determine the transmission timing. In this example, helping to determine transmission timing corresponds to one of the following: offset itself being used as time interval between reception of scheduling information and the correspondent scheduled transmission, or offset added to a time interval as specified in a standard to obtain a new time interval between reception of scheduling information and the correspondent scheduled transmission.

In one example, the table of offset values may be configured by the network device or a gNB, and the table of offset values may be communicated to UE by system information or by RRC signaling. The UE receives scheduling information from the network device. The scheduling information can include an offset index, and/or other information specified for helping calculation of an initial time interval specified in standard. The UE calculates a final time interval by adding the offset value correspondent to the provided index with the initial time interval specified in a standard, e.g., the value k2 in the example of FIG. 2, and transmits the uplink transmission at timing determined, e.g. the time interval between reception of scheduling information and the scheduled transmission equals to final time interval calculated.

In another embodiment, a configurable scaling factor can be included in the scheduling information. The communication device may use the scaling factor for help calculating a time interval between reception of scheduling information and the correspondent scheduled transmission, for example, the scaling factor can multiply with an initial time interval specified in standard, e.g., the value k2 in the example of FIG. 2., to yields the final time interval. The scaling factor may be an integer value or any real number. The UE transmits the scheduled uplink transmission at timing determined.

In another embodiment, an offset may be defined and communicated by the network device to the communication device by system information or radio resource control (RRC) signaling. This offset may be used alone or used to add to an initial time interval as specified in a standard, for determining the final time interval between reception of scheduling information and the correspondent scheduled transmission. This offset can be evaluated based on the maximum round trip delay (RTD) within the cell, or within the beam foot print size. The offset value may be predefined in a standard or configurable by network devices.

In another embodiment, the UE can derive a timing offset value according to Timing Advance (TA) information provided to the communication device by the network device. For example, the network device may broadcast an indicator to notify UE to automatically delay the uplink transmission timing by the value of TA or a value derived based on the value of TA. The value of TA can be derived based on information included in the RA response, MAC CE or signaling information from the gNB or other network device to the UE, or other communication device, or other suitable messaging according to a particular protocol.

Significant transmission delay can result in large range of timing advance (TA) to be adjusted. TA can be adjusted by RA response or by TAC MAC CE (timing advance command medium access control element). The value range of indicator included in RA response or TAC MAC CE to help calculating TA value can be insufficient. To solve this issue, assisting information can be provided to increase the value range of TA to be adjusted. The content of assisting information and methods of utilizing assisting information for determining the TA can be done in similar way as presented in embodiments provided above.

Figure 5:
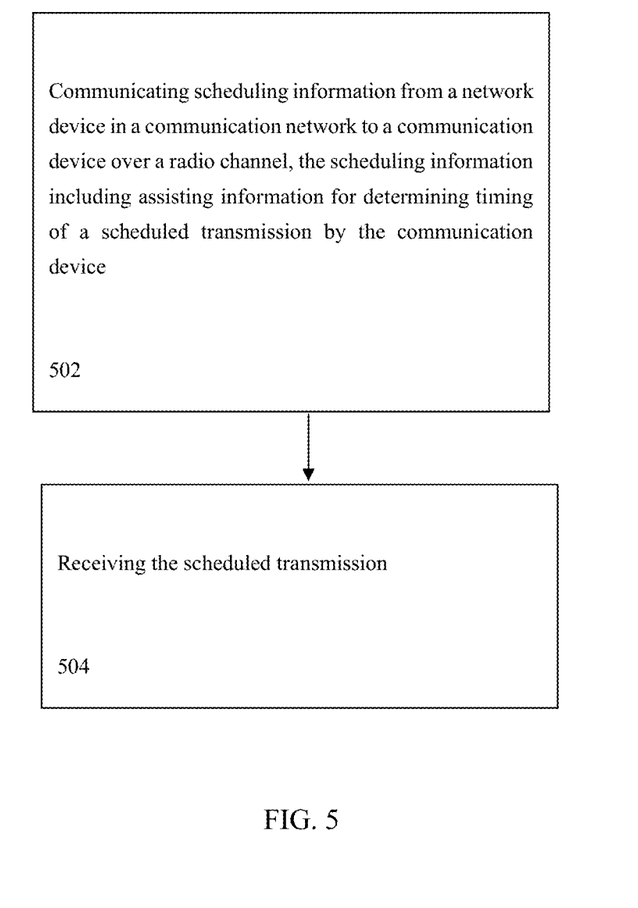

FIG. 5 is an example method for communication in a communication network such communication network 100 of FIG. 1. FIG. 5 shows one embodiment of a method for uplink transmission in a cell with large transmission delay, viewed from the perspective of a network device such as the network device 104 in FIG. 1. At block 502, the method includes a process of communicating scheduling information from a network device in a communication network to a communication device over a radio channel. The scheduling information includes assisting information for determining timing of a scheduled transmission by the communication device. At block 504, the method includes receiving the scheduled transmission.

Thus, in accordance with FIG. 3 and FIG. 4, the gNB or other network device communicates scheduling information including assisting information to the UE or other communication device. As shown in FIG. 4, the communication device uses the information to calculate a timing for transmitting the scheduled transmission. At the calculated time, the scheduled transmission is made and subsequently received by the network device. In this manner, propagation delay or transmission delay between the communication device and the network device is compensated.

Similar embodiments for the assisting information may be used in conjunction with the embodiment of FIG. 5 as were described above in conjunction with FIG. 4. These include, for example, a table of offsets with mapping relationship between each offset value and index being used to adjust timing for scheduled transmission; a configurable scaling factor being used to adjust timing for scheduled transmission; an offset being defined to adjust timing for scheduled transmission; and the UE deriving an offset based on timing advance information provided by the network device.

In step 502 the assisting information may be communicated in any suitable method. For example, it may be communicated in system information sent by the network device to the communication device. In this example, a particular parameter of the system information may be defined, along with acceptable values that will be understood and used by the communication device. Still in this example, assisting information communicated in DCI or RA response or in configured grant can be jointly used with assisting information included in system information. In another example, the assisting information may be sent in downlink control information (DCI). In still another example, the assisting information may be sent in the random access response (RAR) message from the network device to the communication device. For example, the assisting information can be included in either a subheader or in the payload of the RAR message. In still another example, the assisting information can be included in radio resource control (RRC) signaling information, such as RRCReconfiguration during a handover process when communication between the communication device and a first network device is changed to communication with a second network device. Alternatively, combinations of the above methods can be used to communicate assisting information to the UE.

Figure 6:
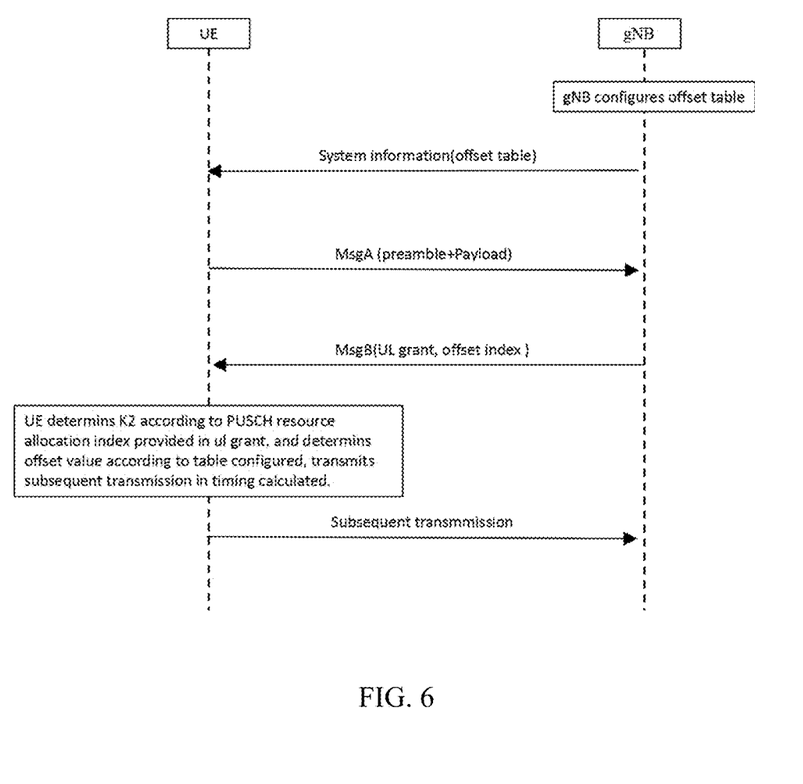

FIG. 6 is an example timing flow diagram illustrating communication in the communication network 100 of FIG. 1. In particular, FIG. 6 illustrates a 2-step RACH procedure. The illustrated method may implemented by any suitable communication devices and any networks.

In a first step, the UE receives from the gNB system information including a configurable offset table with a mapping relationship between offset values and offset indexes.

In a second step, the UE sends a first random access message, referred to as MsgA, over selected RA resource to gNB.

In a third step, the UE receives from gNB RA response message at timing n, referred to as MsgB. This message may include an uplink grant and an offset index. The offset index may be used by the UE to access the offset table previously received and stored at the UE.

In a fourth step, the UE determines the final time interval between reception of MsgB and subsequent transmission scheduled by MsgB. For example, the UE may determine an initial time interval k2+Δ, where k2 determined according to the physical uplink shared channel (PUSCH) resource allocation index provided in the uplink grant and Δ based on subcarrier spacing used transmission of MsgB. Further, the UE determine the final time interval equal to k2+Δ+offset where the offset value is associated with the index provided in MsgB.

In a final step, the UE transmits the scheduled transmission at the determined timing, e.g. in n+k2+Δ+offset.

Figure 7:
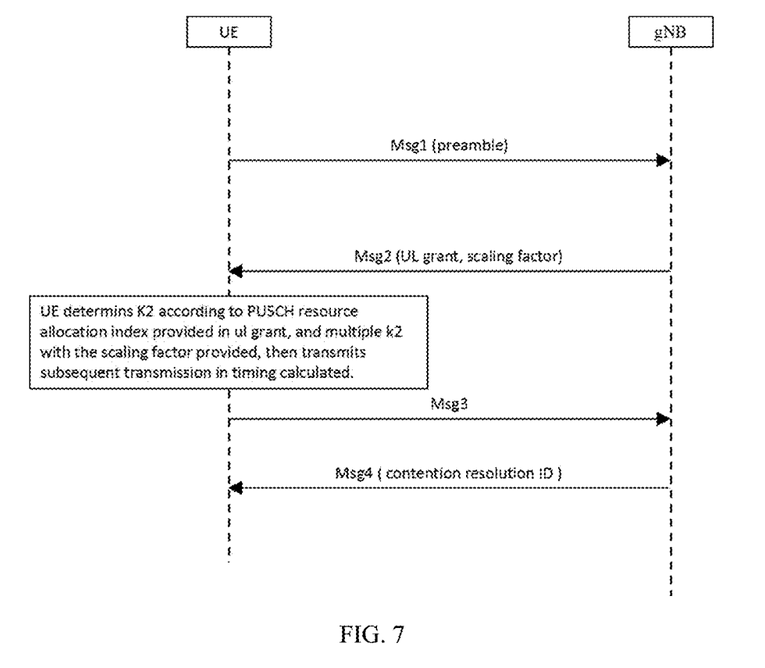

FIG. 7 is an example timing flow diagram illustrating communication in the communication network 100 of FIG. 1. The illustrated method may be extended to other devices and other networks, however. FIG. 7 illustrates a four-step RACH procedure initiated by the UE. In particular, FIG. 7 illustrates communication between a communication device such as a UE and a network device such as a gNB as shown in the example of FIG. 3. The illustrated method may be extended to other devices and other networks, however.

In a first step, the UE sends a first random access message, referred to as Msg1, to the gNB. In a second step, the UE receives a RA response message, referred to as Msg2 from gNB in timing n. This message may include an uplink grant and a scaling factor to be used to adjust timing of transmissions by the UE to compensate for propagation delay in the communication network.

In a third step, the UE determines an initial time interval k2+Δ, where k2 determined according to the physical uplink shared channel (PUSCH) resource allocation index provided in the uplink grant and Δ based on subcarrier spacing used transmission of Msg2. Further, the UE multiples the value k2 with the scaling factor m provided in the RA response message and obtains a final time interval for transmitting scheduled Msg3.

In a fourth step, at the calculated time, e.g. n+k2*m+Δ, the UE transmits Msg3. In a fifth step UE receives Msg4, from gNB for contention resolution.

Figure 8:
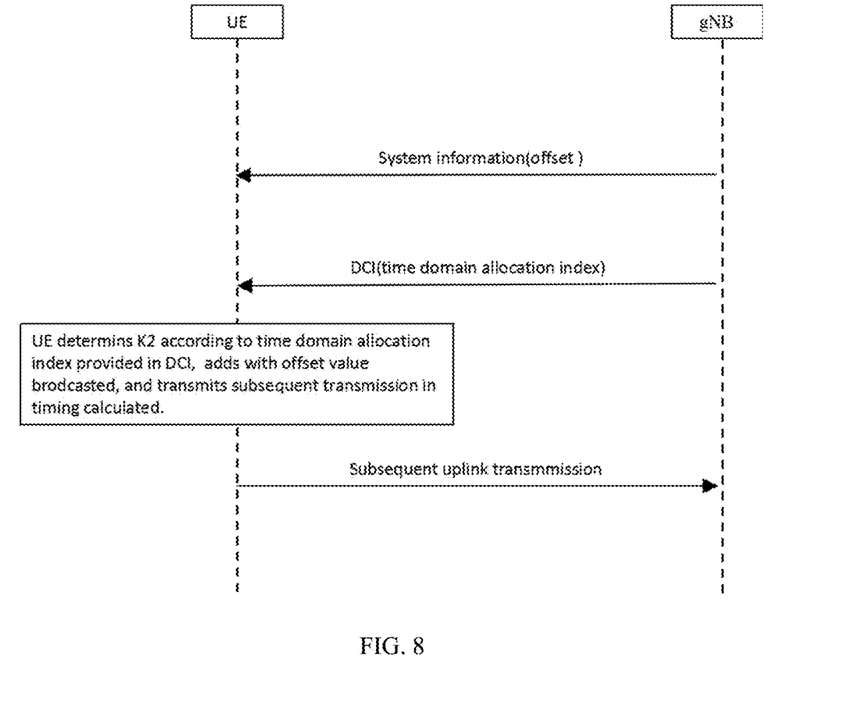

FIG. 8 is an example timing flow diagram illustrating communication in the communication network 100 of FIG. 1. In particular, FIG. 8 illustrates communication between a communication device such as a UE and a network device such as a gNB as shown in the example of FIG. 3. The illustrated method may be extended to other devices and other networks, however.

In FIG. 8, in a first step, UE receives a broadcast information. The broadcast information includes a configurable offset value for use to adjust timing of scheduled transmissions by the UE to compensate for propagation delay in the communication network.

In a second step, UE receives downlink control information (DCI) including a time domain allocation index in timing n. In a third step, the UE determines an initial time interval according to the time domain allocation index provided in the DCI. Further, the UE adds the offset value received in the system information and calculates a final time interval, k2+offset, for a subsequent uplink transmission. Finally, the UE makes the subsequent transmission at the calculated time, n+k2+offset.

In this manner, the communication network can provide assisting information from the network device to the communication device. The communication device can use the received assisting information to calculate a time for uplink transmission.

A further problem remains in the case where preambles from two different UE devices clash at the gNB (see FIG. 2.). In solving this problem, there are different possibilities. In a first possibility, the UE has no access to Global Navigation Satellite System information defining the UE's geographical location. GNSS information can include GPS information, GLONASS information or other similar positioning information.

Figure 9:
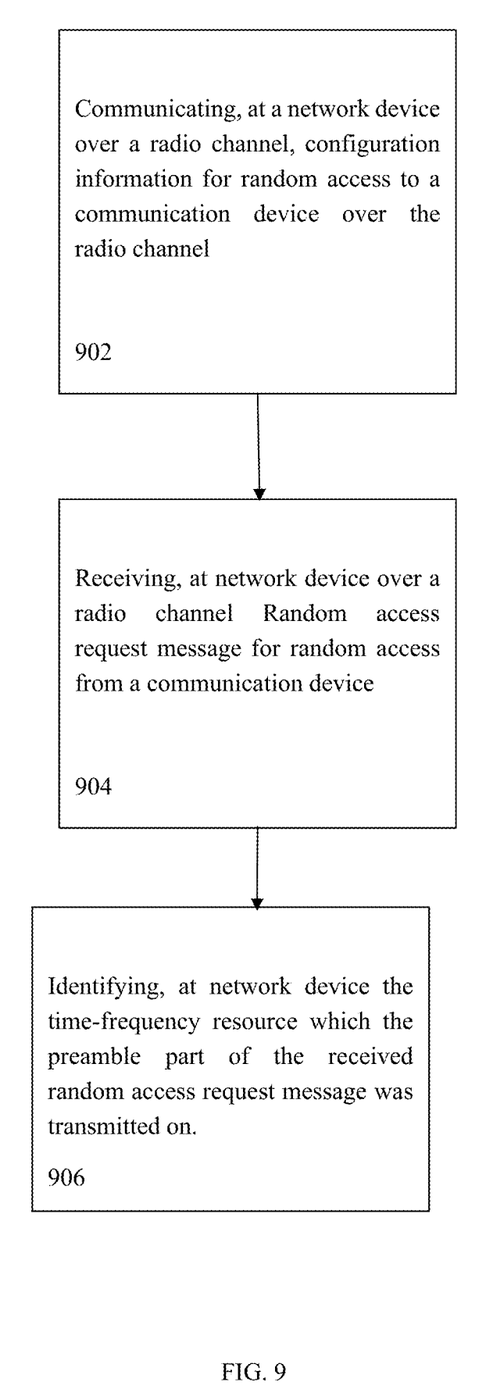
FIG. 9 is an example method for communication in the communication network of FIG. 1.

FIG. 9 is an example method for communication in the communication network of FIG. 1. Operations of the method of FIG. 9 may be performed, for example, in a network device such as a gNB. At block 902, the method includes determining a configuration for random access by a communication device over a radio channel. And delivered the configuration information to UE by system information or RRC signaling. In a step of determining a configuration, a network device determines what resources a communication device may utilize for accessing with the network device. At block 904, the method includes receiving from the communication device over the radio channel a random access (RA) request message, which can be Msg1 for 4-step RACH or MsgA for 2step RACH. At block 906, the method includes identifying a time-frequency resource on which the preamble part of the RA request message was transmitted. A time-frequency resource corresponds to the time and frequency resource used for preamble transmission by the UE.

The configuration of random access resource may include at least one of the following alternatives. A first option is preamble division. In this option, preambles can be divided into different groups and mapped to different time-frequency resources. The time-frequency resource can refer to location of time resource or location of frequency resource or time-frequency resource ID. In an example the same preamble will not be reused in time-frequency resource with time interval less than maximum delay difference within the cell. The mapping between the time-frequency resources and the preamble group can be predefined or be configured by the gNB. For example, in a first step, the UE receives configuration information for performing the random access (RACH) procedure. This configuration information includes the mapping between time-frequency resources and preamble groups. The configuration information can be sent to UE with system information or by RRC signaling. In a second step, the UE selects a time-frequency resource, then selects the preamble to be transmitted within the preamble group that mapped into the selected time-frequency resource. Then, the UE transmits the selected preamble using selected time-frequency resource. The gNB differentiates the location of the time-frequency resource according to the preamble group index the received preamble belongs to.

In a second option, an index for the time-frequency resources can be linked with different root sequences used for generating preamble. In some exemplary systems, a preamble is generated according to a root sequence, which is configured by a parameter known as prach-RootSequenceIndex in a RACH-common information element. In this option, a set of different root sequence indexes can be mapped to different time-frequency resources index, time-frequency resource index can refer to location of time resource or location of frequency resource or time-frequency resource identifier. Once the UE selects the time-frequency resource, it then determines the preamble generated with root sequence associated with the selected time-frequency resource. Then UE transmits selected preamble using selected time-frequency resource. gNB differentiate the location of time-frequency resource according to the preamble received.

A third option involves frequency hopping of preamble. A mapping relation between different frequency used for preamble transmission and different time-frequency resource can be configured or predefined. The frequency cannot be the same in time-frequency resource with time interval less than certain threshold, for example, maximum delay difference within the cell. In this option, UE first selects a time-frequency resource, then selects a preamble and transmits the preamble using frequency associated with the time-frequency resource selected. gNB differentiate the location of time-frequency resource according to the frequency received preamble transmitted by.

A fourth option may be applied to the situation in which the two-step RACH procedure is performed. In this option transmission timing can explicitly or implicitly indicate to gNB to help identify the time-frequency resource received preamble is transmitted. Explicit way can be done by adding timing indication information into the RA request message, referred to herein as MsgA. For example, timing indication information can be an index of the system frame number (SFN) and the slot index within the SFN. It can be included in the payload of MsgA to indicate the time-frequency resources used for transmission of preamble part in MsgA. Or timing indication information can be other sequence representing an absolute timing. It can be included in payload of MsgA to indicate absolute timing when transmitting preamble part in MsgA. Alternatively, the transmission timing can implicitly indicated by the scrambling code for payload of MsgA. In an example, SFN index of the system frame where preamble is transmitted on or SFN index mod N can be used as part of scrambling code of the MsgA payload. For example, if the value SFN_id can stand for SFN index mod N, then RA-RNTI can be used to distinguish the ROs within N SFNs, where the random access-radio network temporary identifier (RA-RNTI) can be computed according to the relation:

$$\text{RA-RNTI} = 1 + s\_id + 14 \times t\_id + 14 \times 80 \times f\_id + 14 \times 80 \times 8 \times \text{SFN\_id} + 14 \times 80 \times 8 \times (N-1) \times ul\_carrier\_id,$$

where
s_id is the index of the first OFDM symbol of the specified PRACH ($0 \leq s\_id < 14$),
t_id is the index of the first slot of the specified PRACH in a system frame ($0 \leq t\_id < 80$),
f_id is the index of the specified PRACH in the frequency domain ($0 \leq f\_id < 8$),
SFN_id can stands for SFN mod N ($0 \leq \text{SFN\_id} < N$), and
ul_carrier_id is the UL carrier used for Msg1 transmission (0 for NUL carrier, and 1 for SUL carrier).

In a fourth option, the gNB can differentiate the location of time-frequency resource according to indication information included in MsgA payload or scrambling code for MsgA payload.

These and other optional embodiments may be used to avoid ambiguity on preamble reception at the gNB caused by the significant propagation delay, so that gNB is able to distinguish the location of time-frequency resource received preamble is transmitted on. These options are feasible if the UE does not have GNSS information available. A fifth option can be provided when the UE does have GNSS information available. In this option, the exact delay can be derived based on the UE GNSS information and ephemeris. Thus the exact timing where gNB will receive the preamble can be derived as well. RA-RNTI or time domain parameters used for the RA-RNTI calculation may be calculated based on gNB timeline. This means the time at which the preamble is received at gNB, not the time the preamble is transmitted by the UE. For this method, assisting information from the UE is required for the gNB to know the exact timing preamble is transmitted. Assisting information for indicating transmission timing can be provided to gNB according similar methods described in the fourth option.

Figure 10:
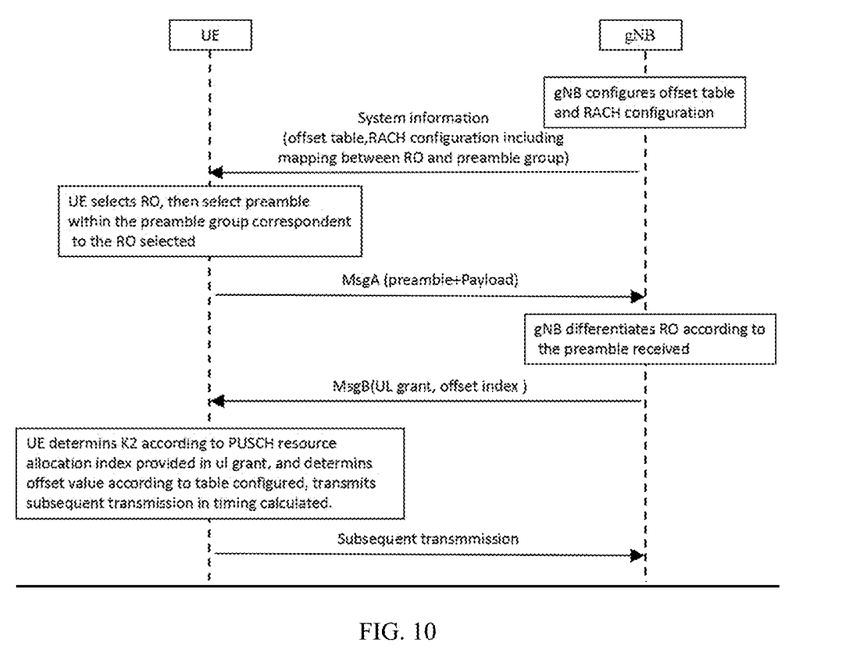
FIG. 10 is an example timing flow diagram illustrating communication in the communication network of FIG. 1.

FIG. 10 is an example method for communication in the communication network of FIG. 1. In a first step, the UE receives system information including an offset table and a random access channel (RACH) configuration. The offset table defines a mapping between time-frequency resources, indicated as "RO" or RACH occasions in FIG. 10 and preamble groups.

In a second step, the UE selects a time-frequency resource, then using the mapping, selects a preamble within the preamble group corresponding to the selected time-frequency resources. The mapping between a preamble group and a time-frequency resource can be utilized by the gNB to determine the location of time-frequency resource received preamble transmitted on.

In a third step, the UE transmits MsgA including preamble and payload to the gNB. In a fourth step, the UE receives RA response message, MsgB from gNB. In this example, the RAR message includes an uplink grant and an offset index. In a sixth step, in response to the RAR message, the UE determines an initial time interval k2+Δ, where k2 determined according to the physical uplink shared channel (PUSCH) resource allocation index provided in the uplink grant and Δ based on subcarrier spacing used transmission of MsgB. and determines an offset value according to the table configured. Further, the UE adds offset value to initial time interval and obtains a final time interval for transmitting subsequent transmission. At the calculated timing, e.g. n+k2+Δ+offset, the UE transmits the subsequent transmission.

Hybrid automatic repeat request (HARQ) is a time-critical procedure for scheduling transmission. To mitigate the large transmission delay's impact on HARQ procedure, feedback can be configured to disabled. Disabled HARQ means a receiver, such as the UE or other communication device, does not need to send feedback to a scheduler, such as the gNB or other network device for each scheduling. Feedback can be disabled or enabled by receiving indication, e.g. statusofHARQfeedback included in system information, or RRC signaling or DCI. For example statusofHARQfeedback set to "1" means feedback is enabled while statusofHARQfeedback set to "0" means feedback is disabled. Another embodiment is to adopt open loop HARQ. Open loop HARQ refers to scheduler, such as the gNB or other network device, scheduling transmission blindly without waiting feedback from receiver, e.g. the UE or other communication device. This embodiment can be applied for HARQ with feedback disabled or enabled. The total scheduling configured by scheduler can be deliver to receiver by DCI or RRC signaling. DCI can include at least one of the following: maximum allowed schedule, redundant version number (RV), HARQ process ID, Modulation and coding scheme (MCS), time resource for scheduled transmission, frequency resource for scheduled transmission, new data indicator (NDI), or other parameter needed for scheduled transmission. Further, an indicator can be included in the DCI to indicate the receiver the order of scheduled transmission, for example to indicate UE this is the fifth scheduled transmission. Or, the order can be implicitly indicated to the receiver by the RV assigned. For example, A table of RV to be used for each schedule can be predefined or configured by scheduler. The mapping relationship of RV and scheduling order can be delivered to the receiver by system information or RRC signaling. The receiver determines the order of each schedule by RV to be transmitted in this schedule.

In an example, the UE receives consecutive scheduling information, e.g. DCI, for scheduling downlink transmissions. The first DCI information includes total schedule expected and other parameters for reception of downlink transmission. The subsequent DCI includes an order indicator and other parameters for reception of downlink transmission. The UE receives downlink transmissions as instructed by the correspondent DCI. The UE may perform soft combining if needed. If the UE received downlink transmission correctly, it will stop monitoring the physical downlink control channel (PDCCH) and flush the correspondent HARQ buffer. If UE doesn't receive scheduled transmission correctly when reaches the maximum allowed schedule time configured in DCI, it will flush HARQ buffer anyway.

From the foregoing, it can be seen that the present invention provides system and method for uplink data transmission in a cell having large transmission delay. In particular embodiments, assisting information may be sent from a network device to a communication device. The assisting information may be used to calculate a timing offset to determine a correct transmission time to compensate for propagation delay in large cell with significant propagation delay.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

The invention claimed is:

1. A method comprising:
receiving, in a first message, a scheduling information by a communication device over a radio channel from a network device, the scheduling information including a resource allocation index for determining an initial time interval;
receiving, a system information including assisting information including a configurable offset value; and
transmitting, by the communication device, a scheduled transmission at a final time interval determined based on the initial time interval and the configurable offset value included in the assisting information.

2. A method comprising:
communicating, in a first message, a scheduling information from a network device in a communication network to a communication device over a radio channel, the scheduling information including a resource allocation index for determining an initial time interval by the communication device;
communicating, a system information including assisting information including a configurable offset value; and
receiving a scheduled transmission at a final time interval determined based on the initial time interval and the configurable offset value included in the assisting information.

3. A wireless communications apparatus comprising a processor and a memory, wherein the processor is configured to read code from the memory and implement a method recited in claim 1.

4. A computer program product comprising a computer-readable program medium code stored thereupon, the code, when executed by a processor, causing the processor to implement a method recited in claim 1.

5. A wireless communications apparatus comprising a processor and a memory, wherein the processor is configured to read code from the memory and implement a method recited in claim 2.

6. A computer program product comprising a computer-readable program medium code stored thereupon, the code, when executed by a processor, causing the processor to implement a method recited in claim 2.

7. The method of claim 1, wherein:
   the scheduling information comprises one of the following: downlink control information (DCI), a configured grant, or uplink grant information carried in random access response.

8. The method of claim 2, wherein:
   the scheduling information comprises one of the following: downlink control information (DCI), a configured grant, or uplink grant information carried in random access response.

9. The method of claim 1, wherein the configurable offset is evaluated based on a maximum round trip delay (RTD) within a cell or within a beam footprint size.

10. The method of claim 2, wherein the configurable offset is evaluated based on a maximum round trip delay (RTD) within a cell or within a beam footprint size.

* * * * *